United States Patent [19]

Nielsen

[11] Patent Number: 4,884,939

[45] Date of Patent: Dec. 5, 1989

[54] SELF-CONTAINED LASER-ACTIVATED DEPTH SENSOR FOR EXCAVATOR

[75] Inventor: Edward G. Nielsen, Grand Rapids, Mich.

[73] Assignee: Laser Alignment, Inc., Grand Rapids, Mich.

[21] Appl. No.: 138,301

[22] Filed: Dec. 28, 1987

[51] Int. Cl.$^4$ .............................................. E02F 5/02
[52] U.S. Cl. ......................... 414/698; 37/DIG. 19; 356/72; 356/375; 901/47
[58] Field of Search ................ 414/698; 37/DIG. 1, 37/DIG. 19; 356/375, 72; 901/47

[56] References Cited

U.S. PATENT DOCUMENTS

| | | | |
|---|---|---|---|
| 3,017,046 | 1/1962 | Runci et al. | 414/713 X |
| 3,708,232 | 1/1973 | Walsh | 356/172 |
| 3,727,332 | 4/1973 | Zimmer | 37/97 |
| 3,813,171 | 5/1974 | Teach et al. | 356/152 |
| 3,887,012 | 6/1975 | Scholl et al. | 172/4.5 |
| 3,900,073 | 8/1975 | Crum | 37/DIG. 19 |
| 3,997,071 | 12/1976 | Teach | 214/761 |
| 4,034,490 | 7/1977 | Teach | 37/86 |
| 4,050,171 | 9/1977 | Teach | 37/86 |
| 4,129,224 | 12/1978 | Teach | 214/763 |
| 4,162,708 | 7/1979 | Johnson | 172/4.5 |
| 4,231,700 | 11/1980 | Studebaker | 414/700 |
| 4,273,196 | 6/1981 | Etsusaki et al. | 172/4.5 |
| 4,393,606 | 7/1983 | Warnecke | 37/DIG. 19 |
| 4,413,684 | 11/1983 | Duncklee | 172/4.5 |
| 4,535,699 | 8/1985 | Buhler | 104/7 B |
| 4,604,025 | 8/1986 | Hammoud | 414/698 |
| 4,726,682 | 2/1988 | Harms et al. | 37/DIG. 19 |

FOREIGN PATENT DOCUMENTS 2101077  1/1983  United Kingdom ................ 414/698

OTHER PUBLICATIONS

MOBA Electronic Brochure entitled, "Laser-Level-System for Controlling Excavation Depth".
Laser Alignment, Inc. brochure entitled, "360° Machine Guidance".

Primary Examiner—Robert J. Spar
Assistant Examiner—Donald W. Underwood
Attorney, Agent, or Firm—Price, Heneveld, Cooper, DeWitt & Litton

[57] ABSTRACT

A laser-actuated depth sensor for an excavator, including a laser receiver, an inclination sensor assembly and indicators to inform the operator of the position and inclination of the excavator stick, is completely self-contained in a housing that may be mounted to the stick of an excavator. The indicators, which are each an array of LEDs, and corresponding indicia are readily visible to the operator who does not have to take his or her eyes off the excavation work zone.

18 Claims, 4 Drawing Sheets

SELF-CONTAINED LASER-ACTIVATED DEPTH SENSOR FOR EXCAVATOR

BACKGROUND OF THE INVENTION

This invention relates to a device for determining the depth to which an excavator is excavating a trench and in particular to such a device that interacts with a remote laser generator to relate the depth of the trench to a preselected distance below the plane of light generated by the laser.

It has been known to mount a laser receiver unit to the stick of an excavator and to operate such a device in conjunction with a stationary remote laser generator in order to relate the depth of the cutting edge of the bucket, which is at the end of the stick, to a fixed reference, the plane of light generated by a laser. Such a device typically informs the operator, through a control panel in the cab, whether a particular point on the receiver is located within the laser plane and, if not, whether the point is above or below the laser plane. The information is conveyed to the operator to allow the operator to make adjustments to the height of the stick to provide control of the depth of the trench. Such a receiver is typically longitudinally adjustable along the stick to provide flexibility in the relationship between the laser reference plane and the cutting edge.

In order for the determination made by the depth sensor to be accurate, it is required that the stick be substantially vertically aligned. Otherwise, the distance from the point on the sensor to the cutting edge will be along a diagonal to the bottom of the trench rather than along a line perpendicular to the laser plane. The position of the stick with respect to true vertical may be determined by a verticality sensor such as a pendant-operated rheostat, or the like, and is provided to the operator on the same control panel that provides the information with respect to the position of the laser plane.

SUMMARY OF THE INVENTION

The present invention provides a laser-actuated depth sensor for an excavator that is completely self-contained in a unit that may be mounted to the stick of an excavator. Rather than a conventional control panel in the cab that an operator must look down at in order to determine the position of the stick, the present invention provides visual indication that is located in the field of vision of the operator who is viewing the excavation zone. The sensor provides simultaneous visual indications to the operator of the position of the unit with respect to the laser plane and the orientation of the stick with respect to true vertical. Because the indications provided the operator are located in the direction of the stick, where the excavating is being performed, the operator does not have to continually glance back and forth between the work area and a panel in the cab.

In addition to the enhanced ease of operation, the present device provides a more rugged, less expensive and more reliable installation because there is no control cable required from the stick-mounted unit to the cab and no separate indicator unit in the cab. Furthermore, all of the components of the system are sealed within one housing which provides enhanced resistance to contamination from the work environment.

These and other related objects, advantages and features of this invention will become apparent upon review of the following specification in conjunction with the drawings.

DESCRIPTION OF THE PREFERRED EMBODIMENT

Figure 1:
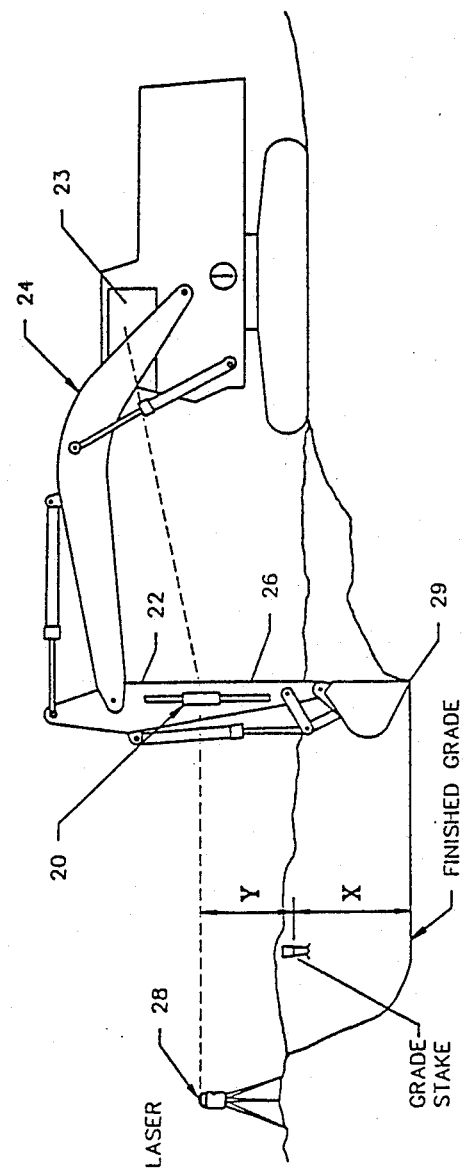
FIG. 1 is a side perspective view of a depth gauge according to the invention mounted on an excavator.

Referring now specifically to the drawings, and the illustrative embodiments depicted therein, a self-contained depth sensor 20 is shown in FIG. 1 mounted to the stick 22 of an excavator 24. The excavator 24 has a separate operator compartment 23. To provide flexibility in the depth of digging, a mounting bar 26 is aligned with the longitudinal axis of stick 22 and attached to the side of stick. Depth sensor 20 is adjustably attached to mounting bar 26 by fastening means 27 (FIG. 3) to allow the sensor to be adjustably mounted at any location along bar 26. Depth sensor 20 is operated in conjunction with a remote laser 28. By knowing the elevation Y of laser 28 (FIG. 1), above a grade stake, sensor 20 may be adjusted such that a center reference point thereon is spaced $X + Y$ from the cutting edge 29 of the excavator to obtain a finished grade which is a desired depth X below the grade stake. Gradations 25 (FIG. 2) may be provided on bar 26 to assist in spacing depth sensor 20 the desired distance $X + Y$ from cutting edge 29.

Figure 2:
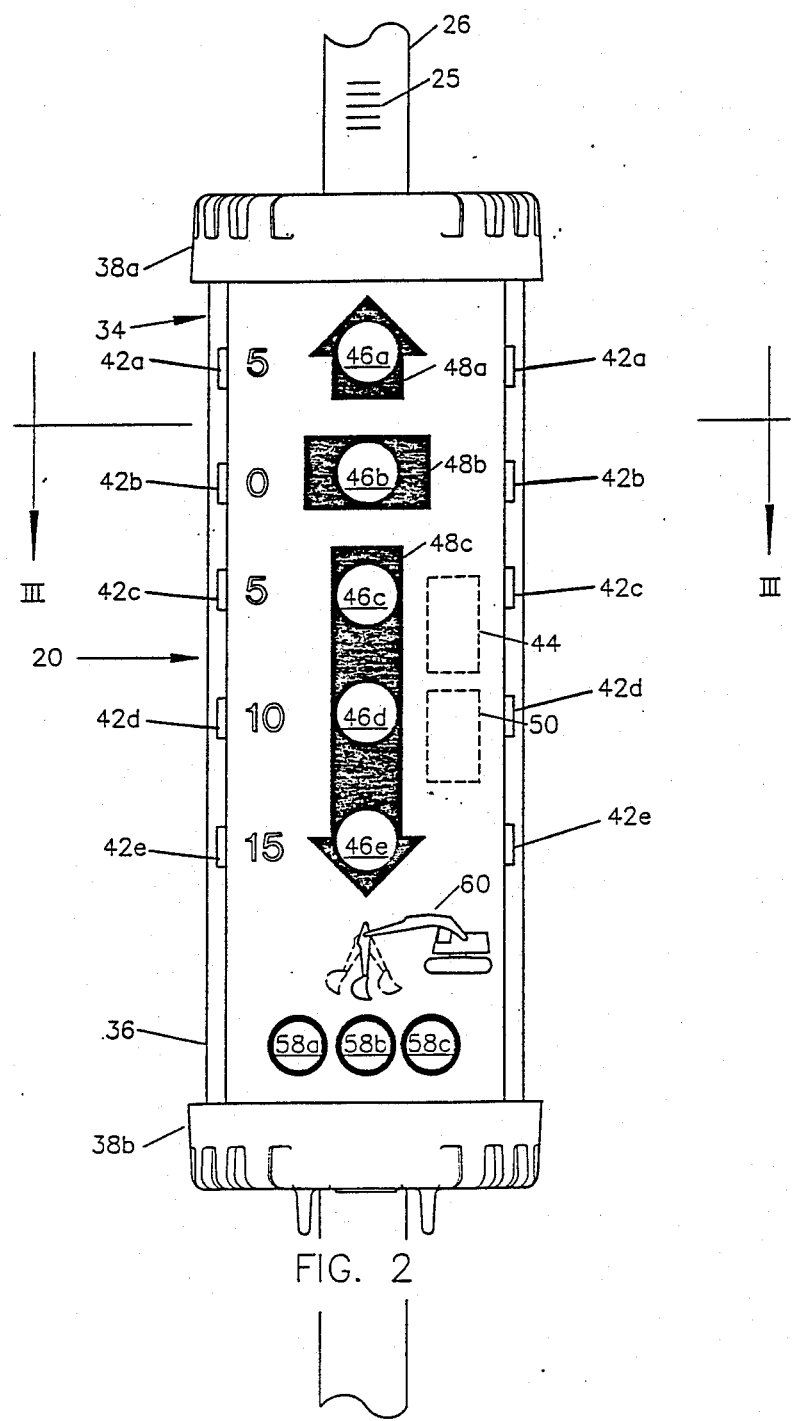
FIG. 2 is a rear view of a unit according to the invention showing the display panel thereon.
Figure 3:
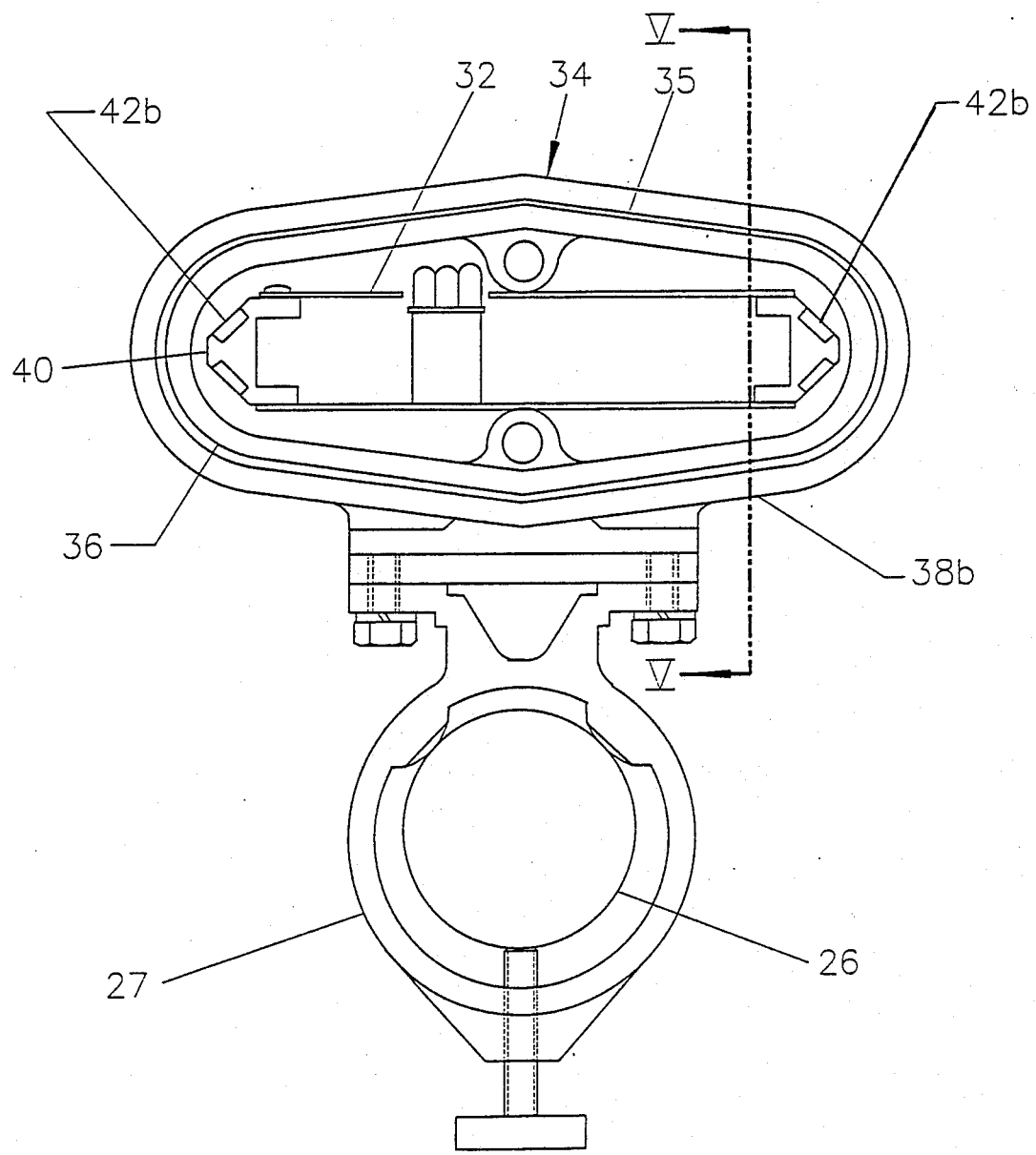
FIG. 3 is a sectional plan view taken along the lines III—III in FIG. 2.

Referring to FIGS. 2 and 3, depth sensor 20 has an electronic assembly 32 mounted within a housing generally shown at 34, which has a sidewall member 36 that is somewhat elliptical in cross section and is transparent over its sides and rear face 35. The rear face is the one facing the operator and is seen in FIG. 2. A pair of end caps 38a and 38b extend over and are sealed against sidewall 36 by an 0-ring or the like (not shown).

Figure 4:
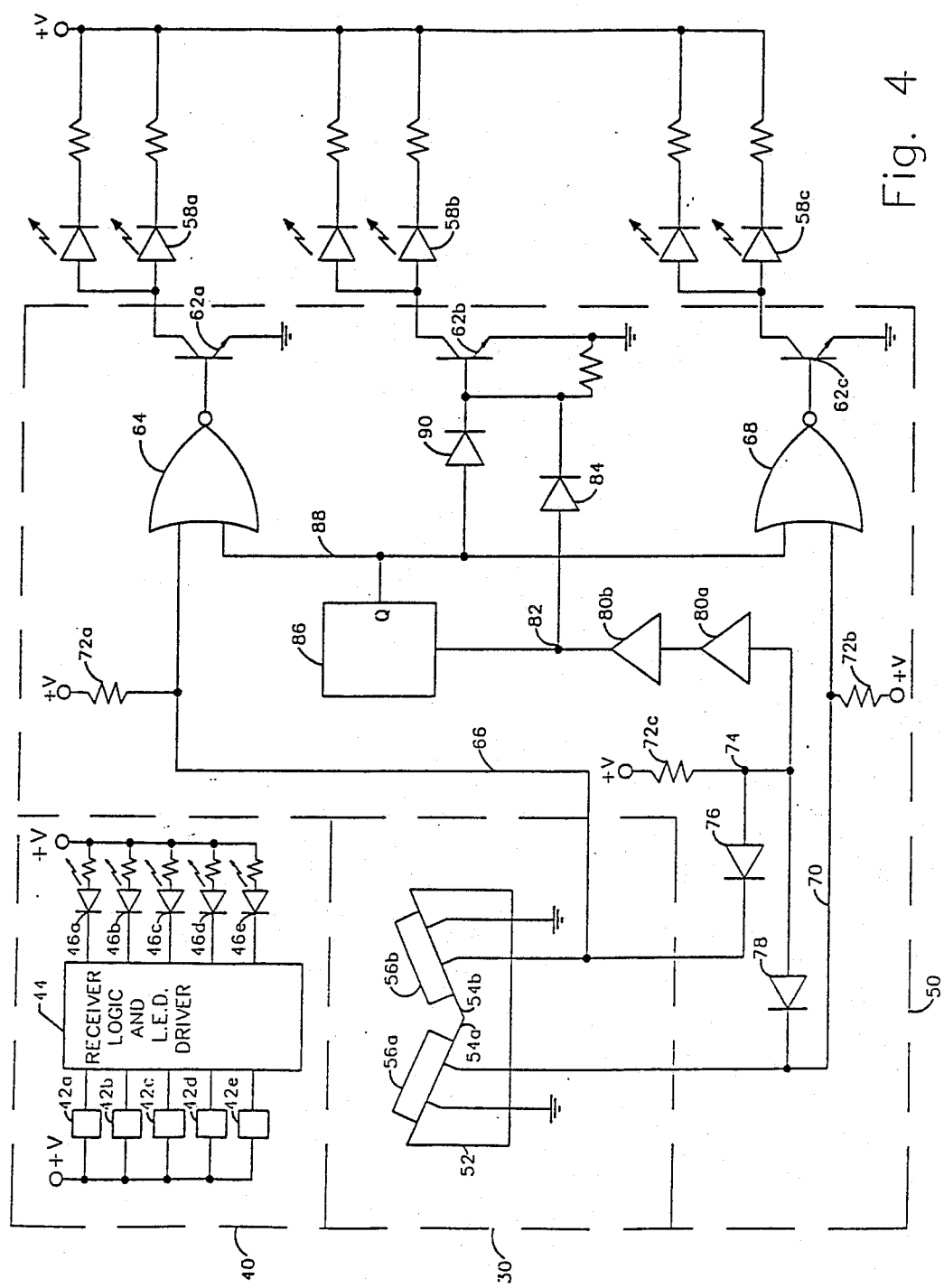
FIG. 4 is an electrical schematic of the unit in FIG. 2.

Electronic assembly 32 includes a laser receiver 40 that contains a plurality of photosensitive cells 42a through 42e spaced along the sides of depth sensor 20. As seen in FIG. 4, each cell is electrically connected at one end to a supply of positive DC voltage $+V$ and at an opposite end to a logic and LED driver circuit 44. Outputs of logic and driver circuit 44 are connected to LED indicators 46a–46e.

Such a laser receiver is conventional and is sold by Laser Alignment, Inc., of Grand Rapids, Michigan under Model No. 38,888. Receiver 40 operates by examining each of the cells 42 and determining if any cell is receiving light pulses above the ambient light level. If so, one of the indicators 46a–46e, corresponding to the cell receiving the light pulses, is illuminated by circuit 44. In this manner, the operator is able to determine the relationship of the depth sensor 20 to the laser plane, and hence the relationship of the cutting edge of the bucket to the desired depth, by observing which indicator 46a–46e is illuminated.

For example, if indicator 46a is illuminated, the cutting edge is five centimeters below the desired depth. If indicator 46b is illuminated the cutting edge is at the desired trench depth. If one of indicators 46c-46e are illuminated then the cutting edge is five centimeters, ten centimeters or fifteen centimeters, respectively, above the desired depth. Indicia 48a is provided around indicator 46a and is large enough to be visible from the cab, to indicate to the operator that, if that indicator is illuminated, the cutting edge is too low. Indicia 48c around indicators 46c-46e indicates to the operator that the cutting edge is too high if one lamp encompassed by the indicia is illuminated. A rectangular indicia 48b around indicator 46b informs the operator that, if that indicator is illuminated, the desired depth is reached and no further adjustment is desired.

Figure 5:
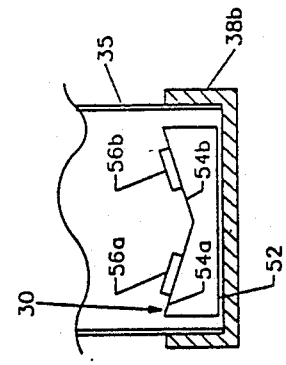
FIG. 5 is a partial sectional view taken along lines V—V in FIG. 3.

In order to determine whether the stick is substantially vertically oriented and that the indications given by indicators 46a-46e are, therefore, valid, inclination sensing means is provided for sensing the inclination of the stick with respect to true earth vertical. The inclination sensing means includes an inclination sensor assembly 30, a logic circuit 50 and indicators 58a-58c. Inclination sensor assembly 30 (FIGS. 3 and 5) includes a base 52 having intersecting sloping surfaces 54a and 54b thereon. Surface 54a slopes downward toward rear face 35. Surface 54b slopes downwardly away from rear face 35. Mercury switches 56a and 56b are mounted on surfaces 54a and 54b, respectively. Therefore, as the stick and the bucket attached to it are pivoted away from the cab, surface 54b will approach horizontal and switch 56b will change from an open state to a closed state. Alternatively, as the bucket and stick are pivoted towards the cab, surface 54a will approach horizontal and switch 56a will change from an open state to a closed state.

Referring to FIG. 2, LED indicator 58a provides visual indication means for advising the operator that switch 56b has changed from an open to a closed state and, accordingly, that the stick is pivoted away from the cab. LED indicator 58c provides visual indication means for advising the operator that switch 56a has changed from an open to a closed state and, accordingly, that the stick is pivoted towards the cab. Central LED indicator 58b provides visual indication means for advising the operator that both switches 56a and 56b are in an open state and, accordingly, that the stick is substantially vertical An indicia 60 is provided adjacent indicators 58a-58c and of a large enough size to advise the operator of the meaning of each indicator.

Referring now to FIG. 4, indicators 58a-58c and 46a-46e are shown as individual diodes or diode pairs. However, in a preferred embodiment, each indicator is a cluster of seven LEDs arranged in a circle to provide more noticeable visual indication. Each indicator cluster 58a-58c is energized by a corresponding driving transistor 62a≈62v which illuminates the indicator when a base drive current is present.

A NOR gate 64, having an output connected to the base of transistor 62a, receives an input on a line 66 connected to one terminal of switch 56b. An opposite terminal of switch 56b is connected to a common ground. A NOR gate 68, having an output connected to the base of transistor 62c, receives an input from a line 70 connected to one terminal of switch 56a. An opposite terminal of switch 56a is connected to ground. Lines 66 and 70 are each connected to a DC voltage +V by pull-up resistors 72a and 72b, respectively.

Accordingly, when switch 56b is in an open state, line 66 is at a positive voltage level. When switch 56b is in a closed state, line 66 is at zero volts. Similarly, line 70 is at a positive voltage when switch 56a is open state and at a ground potential when switch 56a is in a closed state. When switch 56b is in an open state, the positive voltage on line 66 causes gate 64 to produce a low state output and indicator 58a is not illuminated. Similarly, when switch 56a is in an open state, the DC voltage on line 70 causes gate 68 to produce a low output and indicator 58c is not illuminated.

When switch base 52 is substantially level, i.e., the stick is vertical, both switches 56a and 56b are in an open state and, thus, indicators 58a and 58c are not illuminated. With lines 66 and 70 accordingly at +V volts a pull-up resistor 72c connected to +V causes a junction 74 between a diode 76 connected to line 66 and a diode 78 connected to line 70, to be at a positive voltage. Junction 74 provides an input to a pair of series connected invertors 80a and 80b whose output is provided at a junction 82. Junction 82 is connected through a diode 84 to the base of transistor 62b. Accordingly, when line 82 is at positive voltage, which corresponds to switches 56a and 56b both being in an open state, transistor 62b is driven to a conductance state and indicator 58b is illuminated.

Junction 82 is additionally connected to the input of a positive-edge-trigger monostable, multi-vibrator 86 which provides a positive voltage output on a line 88 for a predetermined period of time after the voltage on junction 82 changes from a low to a high (positive voltage) state. Line 88 is, in turn, connected to NOR gates 64 and 68 and, through a diode 90, to the base of transistor 62b. Thus, when the voltage on junction 82 switches from a low to a high state, indicator 58b is energized by a path through diode 84. In addition, the output of multi-vibrator 86 immediately goes high providing a current through diode 90 to maintain transistor 62b conducting during the time interval to which device 86 is set, even if the voltage on line 82 goes low during this interval Additionally, a high signal on line 88 clamps the output of NOR gates 64 and 68 in a low state regardless of the state of lines 66 and 70.

In operation, if the stick is vertical, and the inclination sensor assembly accordingly horizontal, switches 56a and 56b will be in an open state. Accordingly, lines 66 and 70 will be in a high state and the outputs of gates 64 and 68 will be low. Indicators 58a and 58c will thus be off. The state of junctions 74 and 82 will be high and transistor 62b will be conducting, causing indicator 58b to be illuminated. If the stick is pivoted away from the cab, switch 56b will switch from an open to a closed state. In addition, line 74 will be forced low through diode 76 and line 82 will go low. Provided sufficient time has lapsed since line 82 had last switched to a high state for multi-vibrator 86 to time-out, the low signal on line 82 will cause transistor 62b to become nonconducting and indicator 58b to go off. In addition, the output from NOR gate 64 will go high and indicator 58a will become illuminated. Likewise, if stick and bucket are rotated toward the cab, then switch 56a will change from an open to a closed state causing line 70 to go low causing junctions 74 and 82 to be driven low through diode 78. If sufficient time has elapsed since line 82 had last switched to a high state, NOR gate 68 will provide a positive voltage output which will illuminate indicator 58c and transistor 62b will be switched off, thus extinguishing illuminator 58b.

If the stick is moved from a position pivoted away from the cab, through the substantially vertical position, to a position pivoted toward the cab, or vice versa, in a rapid sequence, then multi-vibrator 86 will continue to provide an output on line 88 even after line 82 goes low. Line 88 will cause center indicator 58b to be illuminated and indicators 58a and 58c to be extinguished for the predetermined period of time, which is the time required for device 86 to time-out. The purpose of device 86 is to maintain center indicator 58b illuminated, and indicators 58a and 58c extinguished, for a deliberate period of time even if the stick moves rapidly through the vertical position. This gives the operator sufficient time to observe the illumination of the center light in order to have a "feel" for the vertical position of the stick. The time period for device 86 is preferably set for approximately one second.

To utilize the present device to, for example, dig a trench to a depth "X" below grade, a laser generator is set up at any convenient elevation "Y" above the grade stake. The position of depth sensor 20 along mounting bar 26 is adjusted so that it is precisely X+Y from the cutting edge 29 of the bucket. The operator then proceeds to excavate in a conventional manner until he or she estimates that the desired trench depth is being approached. The operator then extends the bucket to a preselected position and positions the stick with the cutting edge on the trench floor. The stick control lever (not shown) is adjusted, while the operator observes the status of verticality indicators 58a-58c, until the center indicator 58b is the one illuminated. The operator then observes which of the laser-receiver indicators 46a-46e is illuminated to determine the depth of the trench with respect to the desired depth or finished grade. This process is repeated as often as necessary until the depth of the trench equals the desired depth. The entire excavating process, including determining the depth of the trench, may be performed without the operator removing his or her line of sight from the excavation zone. Thus, continual eye movement back and forth between the excavation zone and a cab-mounted instrument panel, which may give rise to operator strain and fatigue, is avoided with the invention.

Changes and modifications in the specifically described embodiments can be carried out without departing from the principles of the invention. For example, a pendulum-operated rheostat and appropriate interface circuitry could be substituted for the mercury-switch sensor assembly as a means for determining the inclination of the stick. The exclusive rights are intended to be limited only by the scope of the appended claims, as interpreted according to the principles of patent law including the doctrine of equivalents.

The embodiments of the invention in which an exclusive property or privilege is claimed are defined as follows.

1. In an excavator apparatus including a stick controllable by an operator located in an operator compartment spaced a distance from said stick, said stick being capable of movement to a vertical orientation and to different inclined orientations; a cutting edge connected to said stick and; a depth sensor mounted to said stick; the improvement comprising:

said depth sensor comprising a self-contained laser actuated sensor including housing means having exterior wall means, said housing means including an electronic assembly for determining depth of said cutting edge and inclination of said stick;

said electronic assembly including a plurality of light responsive cells exposed on at least one side of said housing means on and responsive to contact with a laser beam to provide a first signal;

said electronic assembly further including first indicator means and a first lighted visual indicator; said indicator means located in said housing and responsive to said first signal when a laser beam contacts said cell for displaying on said first lighted visual indicator a first lighted visual indication to the operator indicative of the depth of said cutting edge, said first lighted visual indicator being located and exposed on one side of said housing means so as to face said operator compartment;

said electronic assembly also including inclination sensing means within said wall means responsive to the orientation of said housing means for producing a second signal when the housing means is substantially at a predetermined relationship to said earth's vertical and for producing one of a third and fourth signal when said housing means is not substantially at said relationship;

said electronic assembly including second indicator means including second, third and fourth lighted visual indicators exposed on the same one side of said housing means as said first lighted visual indicator, said second indicator means responsive to said inclination sensing means for displaying on said second lighted visual indicator a second lighted visual indication when said second signal is present and for displaying on one of said third and fourth lighted visual indicators one of a third and fourth lighted visual indication when one of said third and fourth signals is present, respectively;

said second indicator means displaying at any one time one of said second, third or fourth lighted visual indications; and said first, second, third and fourth lighted visual indicators being sufficiently large and intense to be visible and observable from the operator compartment whereby, with said housing means mounted to the stick and said first, second, third and fourth lighted visual indicators facing the operator compartment, the excavator operator can view said lighted visual indicators from said operator compartment and adjust the position of the stick while simultaneously looking at it and the work area and observing which of said second, third or fourth signals are being displayed by the lighted visual indicators of said second indicator means.

2. The depth sensor in claim 1 in which each of said lighted indicators comprises an LED.

3. The depth sensor in claim 2 in which each of said lighted indicators comprises an array of LEDs.

4. The depth sensor in claim 1 in which said inclination means produces said third signal when said stick is not substantially vertical such that said stick is pivoted too far from said cab and produces said fourth signal when said stick is not substantially vertical such that said stick is pivoted too close to said cab.

5. The depth sensor in claim 4 in which said inclination sensing means further includes delay means for preventing said second signal from being present for less than a predetermined time period.

6. The depth sensor in claim 1 in which said inclination sensing means further includes delay means for preventing said second signal from being present for less than a predetermined time period.

7. The depth sensor in claim 1 further including indicia adjacent each of said indicators, said indicia observable from a substantial distance from said housing.

8. In an excavator apparatus including a cutting means mounted on a stick which is controllable by an operator located in an operator compartment spaced a distance from said cutting means, said stick and cutting means being capable of movement to various angular positions with respect to the earth; a laser-actuated depth sensor mounted on said excavator and movable with said cutting means for determining the depth of the cutting means to determine the depth of an excavation being dug by said cutting means, the improvement comprising:

wall means defining an enclosed housing means;

an electronic assembly in said housing means including a laser receiver exposed on said housing means, inclination sensing means mounted within said housing means and responsive to gravity for determining the inclination of a plane traversing said housing means with respect to the earth's vertical, indicating means within said housing means and responsive to said laser receiver and said inclination sensing means for providing an indication of the position of said laser receiver relative to the plane of said laser beam and at the position of the stick with respect to said earth's vertical so as to determine in what direction the stick and cutting means is to be moved whereby the direction of movement of said stick and cutting means can be made for substantially aligning said stick in a predetermined relationship to said earth's vertical while positioning said cutting means at a desired depth; said indicating means including lighted display means exposed on a side of said housing means facing the operator compartment of the excavator and responsive to said indicating means for displaying said indication, said display means being of sufficient intensity whereby an excavator operator in said operator compartment can view said lighted display means while simultaneously viewing the stick, cutting means and the work area in which the excavation is taking place.

9. The depth sensor in claim 8 further including mounting means for mounting said housing to the stick of an excavator.

10. The depth sensor in claim 9 in which said mounting means includes adjustment means for adjustably positioning said housing in said plane.

11. The depth sensor in claim 8 in which said inclination sensing means includes two surfaces inclined with respect to said plane and a gravity sensing switch on each of said surfaces.

12. The depth sensor in claim 8 in which said lighted display means includes said wall having a transparent portion juxtaposed a light means.

13. The depth sensor in claim 12 in which said display means includes a first indicator light that is illuminated when said receiver is being contacted by a laser beam and a second indicator light that is illuminated when said stick is aligned with earth vertical.

14. The depth sensor in claim 13 in which said display means further includes a third indicator light that is illuminated when said plane is pivoted a first direction away from earth vertical and a fourth indicator light that is illuminated when said plane is pivoted a second direction away from earth vertical opposite said first direction.

15. The depth sensor in claim 14 in which said display means comprises an array of LEDS.

16. The depth sensor in claim 14 further including delay means for preventing said second indicator light from being illuminated for less than a predetermined time period.

17. The depth sensor in claim 14 further including indicia adjacent each of said indicators light illustrative of the meaning of the respective said indicator light.

18. The depth sensor of claim 1 in which the housing means is a single housing including said exterior wall means facing the operator compartment of the excavator, said first lighted visual indicator including a plurality of vertically arranged and spaced lights adapted to be lighted only one at a time; said second third and fourth lighted visual indicators each including a light spaced horizontally one from the other immediately adjacent the lights of said first lighted visual indicator and adapted to be lighted only one at a time whereby an operator can easily read the illumination of both sets of lights while operating the cutting edge of the excavator and while viewing the stick, cutting edge and work area in which the excavation is taking place.

* * * * *

UNITED STATES PATENT AND TRADEMARK OFFICE
CERTIFICATE OF CORRECTION

PATENT NO. : 4,884,939

DATED : December 5, 1989

INVENTOR(S) : Edward G. Nielsen

It is certified that error appears in the above-identified patent and that said Letters Patent is hereby corrected as shown below:

Column 3, Line 46
  After "vertical" insert --.--.

Column 3, Line 55
  "62a≅62v" should be --62a - 62c--.

Signed and Sealed this

Thirteenth Day of August, 1991

Attest:

HARRY F. MANBECK, JR.

Attesting Officer

Commissioner of Patents and Trademarks